United States Patent
Gretz

(10) Patent No.: US 7,307,214 B1
(45) Date of Patent: Dec. 11, 2007

(54) ELECTRICAL FIXTURE MOUNTING ASSEMBLY WITH SEALING FLANGE

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/711,432

(22) Filed: Feb. 26, 2007

(51) Int. Cl.
*H01H 9/02* (2006.01)

(52) U.S. Cl. ............................ 174/58; 174/61; 174/63; 174/54; 220/3.9; 248/343

(58) Field of Classification Search ................. 174/58, 174/54, 63, 61, 53; 248/343, 300, 906; 220/3.9, 220/3.3; 383/9; 206/806; 200/297, 296
See application file for complete search history.

(56) References Cited

U.S. PATENT DOCUMENTS

| | | | |
|---|---|---|---|
| 4,892,211 A | 1/1990 | Jorgensen | |
| 5,234,119 A | 8/1993 | Jorgensen et al. | |
| 5,775,032 A * | 7/1998 | Lacy | 52/28 |
| 5,854,443 A | 12/1998 | Reiker | |
| 6,107,568 A * | 8/2000 | Schnell et al. | 174/61 |
| 6,291,768 B1 * | 9/2001 | Reiker | 174/62 |
| 6,355,883 B1 | 3/2002 | Gretz | |
| 6,545,216 B1 * | 4/2003 | Bell et al. | 174/50 |
| 6,595,479 B2 * | 7/2003 | Johnson et al. | 248/343 |
| 6,677,523 B1 | 1/2004 | Gretz | |
| 6,768,071 B1 * | 7/2004 | Gretz | 200/297 |
| 6,967,284 B1 * | 11/2005 | Gretz | 174/58 |

\* cited by examiner

*Primary Examiner*—Dhiru R. Patel

(57) ABSTRACT

A mounting assembly for securing an electrical fixture to a ceiling in an airtight fit. The mounting assembly includes a pair of box members connected by a bridge. A flange is provided coplanar with the bridge and extending outward transversely around the periphery of the box members. A channel is provided between the bridge and box members and mounting fasteners are frictionally held within temporary storage receptacles in the mounting assembly. The mounting fasteners are removed from the temporary storage receptacles and secured through the bridge to secure the mounting assembly to the beam. The flange provides a sealing surface for sealing against air infiltration around the periphery of the electrical box. Duct seal may be applied around the periphery of the cables at the knockout areas to provide an airtight seal for the electrical cables entering the electrical box.

18 Claims, 6 Drawing Sheets

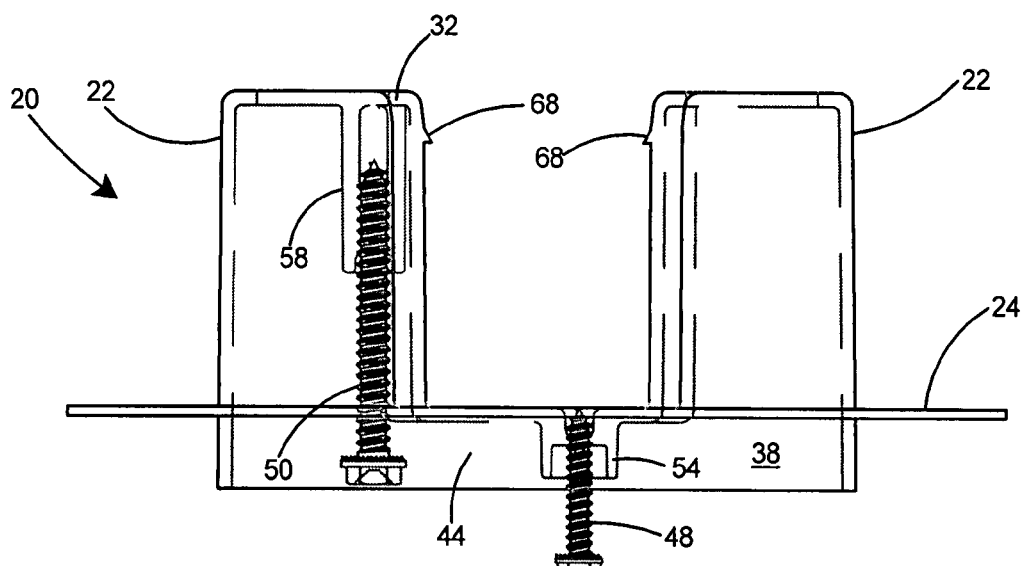
Fig. 8
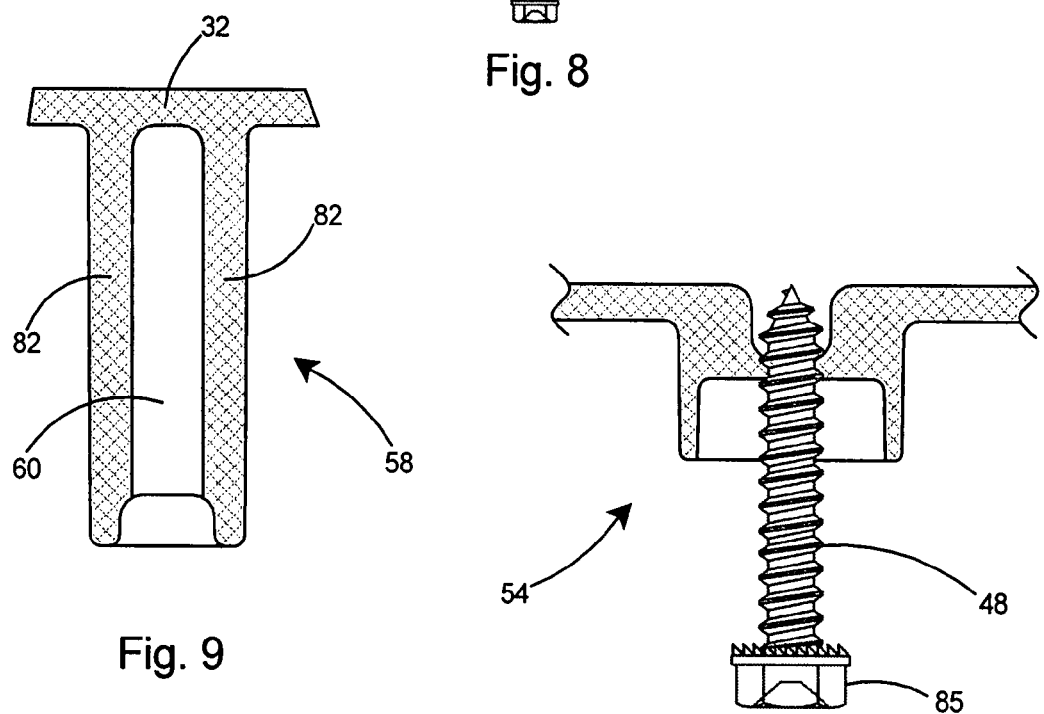
Fig. 9
Fig. 11
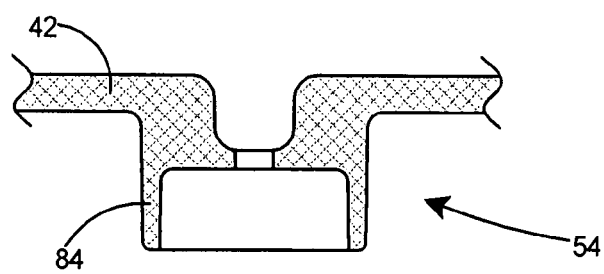
Fig. 10

US 7,307,214 B1

ELECTRICAL FIXTURE MOUNTING ASSEMBLY WITH SEALING FLANGE

FIELD OF THE INVENTION

This invention relates to electrical boxes and specifically to an electrical fixture mounting assembly including a peripheral flange for airtight mounting of an electrical fixture to a ceiling.

BACKGROUND OF THE INVENTION

To achieve energy efficiency, a common goal in building construction, it is necessary to insulate and minimize air infiltration through ceilings. Typical ceiling construction to minimize air infiltration includes installing insulation between the rafters and installing a vapor barrier, such as polyethylene, under the rafters, and applying an interior covering such as sheetrock over the vapor barrier.

Unfortunately, the installation of conventional electrical boxes to ceilings oftentimes compromises the air tightness of a building. Typically, electrical boxes are fastened to the rafters and wiring pulled into the boxes prior to installation of the vapor barrier. The vapor barrier and sheet rock are typically installed over the electrical boxes and holes then cut in the vapor barrier and sheetrock to expose the electrical boxes.

A couple of problems arise when holes are cut in the vapor barrier for conventional electrical boxes. Since the front edge of the electrical box extends to approximately level with the interior ceiling, the hole is typically cut larger than the periphery of the electrical box. With the hole larger than the electrical box, air seepage can occur around the periphery of the electrical box. The air seepage occurs as a result of the disruption of the integrity of the vapor barrier around the box and the inability of the conventional electrical box to create a proper seal with the vapor barrier.

A second source of air infiltration is through the conventional electrical box itself. This can occur as a result of oversized knockouts in the box and the lack of proper sealing materials around the electrical cables leading into the box.

What is needed therefore is an electrical fixture mounting assembly that stops air infiltration around the periphery of the box and also enables proper sealing at the knockout areas wherein the electrical cables enter the box.

SUMMARY OF THE INVENTION

The invention is a mounting assembly for securing an electrical fixture to a ceiling in an airtight fit. The mounting assembly includes a pair of box members connected by a bridge. A flange is provided coplanar with the bridge and extending outward transversely around the periphery of the box members. A channel is provided between the bridge and box members and mounting fasteners are frictionally held within temporary storage receptacles in the mounting assembly. The mounting assembly can be mounted to an overhead beam with the beam seated in the channel. The mounting fasteners are removed from the temporary storage receptacles and secured through the bridge to secure the mounting assembly to the beam. The flange provides a sealing surface for sealing against air infiltration around the periphery of the electrical box. Duct seal is applied around the periphery of the cables at the knockout areas to provide an airtight seal for the electrical cables entering the electrical box.

OBJECTS AND ADVANTAGES

A first advantage of the electrical fixture mounting assembly of the present invention is that it provides an airtight electrical box installation. The fixture mounting assembly includes a transversely extending flange to seal around the outer periphery of the box. Knockouts in the assembly can be removed selectively as desired to create openings for electrical cables and thereby minimize open areas and enable easier sealing around the cable openings.

Another advantage provided by the electrical fixture mounting assembly of the present invention is that the mounting arrangement is provided with the electrical box. As a result, the fasteners are readily available to the installer. All of the fasteners required to mount the assembly to an overhead beam are frictionally held within temporary storage receptacles within the assembly. Having all of the required fasteners on hand saves time during installation of the electrical fixture.

A further advantage of the electrical box assembly of the present invention is that the internal mounting arrangement is located within the confines of the internal enclosure. Therefore the electrical box assembly forms a compact profile that can be easily packaged for shipping or storage.

These and other objects and advantages of the present invention will be better understood by reading the following description along with reference to the drawings.

DESCRIPTION OF THE DRAWINGS

FIG. 8 is a conceptual view of the mounting assembly showing the location of the captive fasteners within the electrical box.

FIG. 9 is a sectional view of a boss for holding the fixture mounting screws of the present invention.

FIG. 10 is a sectional view of a boss for holding an initial mounting screw according to the present invention.

FIG. 11 is a sectional view of the boss of FIG. 10 with the initial mounting screw held captive held therein.

TABLE OF NOMENCLATURE

Figure 1:
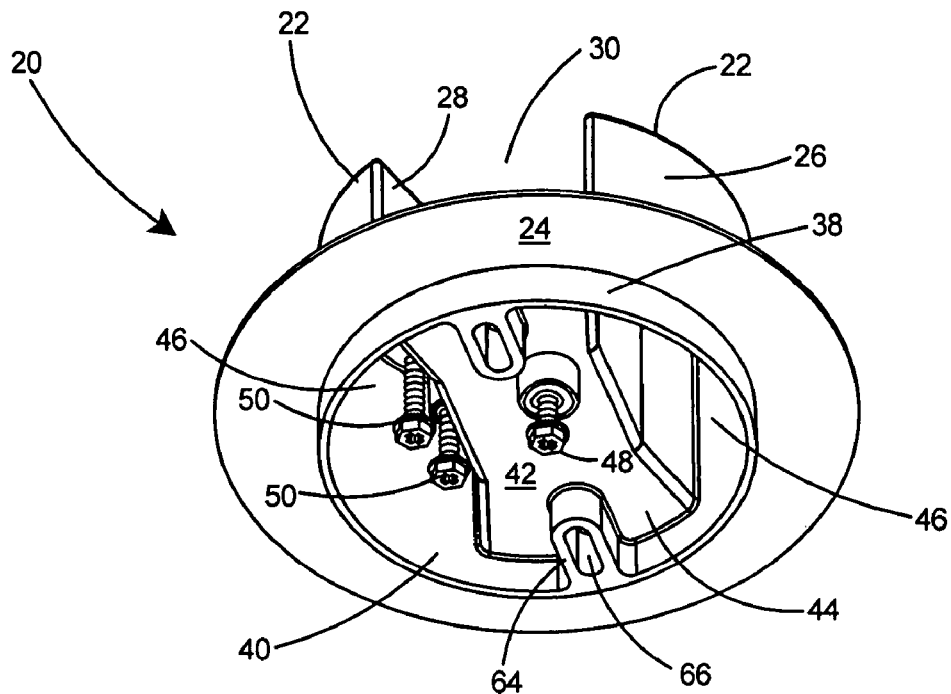
FIG. 1 is a bottom perspective view of a preferred embodiment of an electrical fixture mounting assembly according to the present invention.

The following is a listing of part numbers used in the drawings along with a brief description:

| Part Number | Description |
| --- | --- |
| 20 | electrical fixture mounting assembly |
| 22 | box member |
| 24 | integral flange |
| 26 | arcuate outer sidewall |
| 28 | inner sidewall |
| 30 | central channel |
| 32 | top wall |
| 34 | planar center portion of inner sidewall |
| 36 | planar outer portion of inner sidewall |
| 38 | peripheral wall |
| 40 | bottom opening |
| 42 | bridge |
| 44 | lower cavity |
| 46 | upper cavity |
| 48 | captive initial fastener |
| 50 | captive mounting fastener |
| 52 | knockout |
| 54 | shallow boss |
| 56 | bore |
| 58 | long boss or temporary storage receptacle |
| 60 | bore |
| 62 | electrical fitting |
| 64 | mounting boss |
| 66 | slot |
| 68 | teeth |
| 70 | top surface of bridge |
| 72 | top surface of flange |
| 74 | edge of center portion of inner sidewall |
| 76 | outer wall portion of mounting boss |
| 78 | inner wall portion of mounting boss |
| 80 | planar lower edge of peripheral wall |
| 82 | thick wall portion of long boss |
| 84 | wall portion of shallow boss |
| 85 | head of initial fastener |
| 86 | directional arrow |
| 88 | rafter or beam |
| 90 | vapor barrier |
| 92 | span of channel |
| 94 | electrical wiring or cables |
| 96 | duct seal |
| 98 | path of mounting fasteners |
| 100 | light fixture |
| 102 | mounting ring |
| 104 | aperture in mounting ring |
| 106 | sheetrock |
| 108 | ceiling |
| L1 | length of peripheral wall |

DETAILED DESCRIPTION OF THE INVENTION

Figure 2:
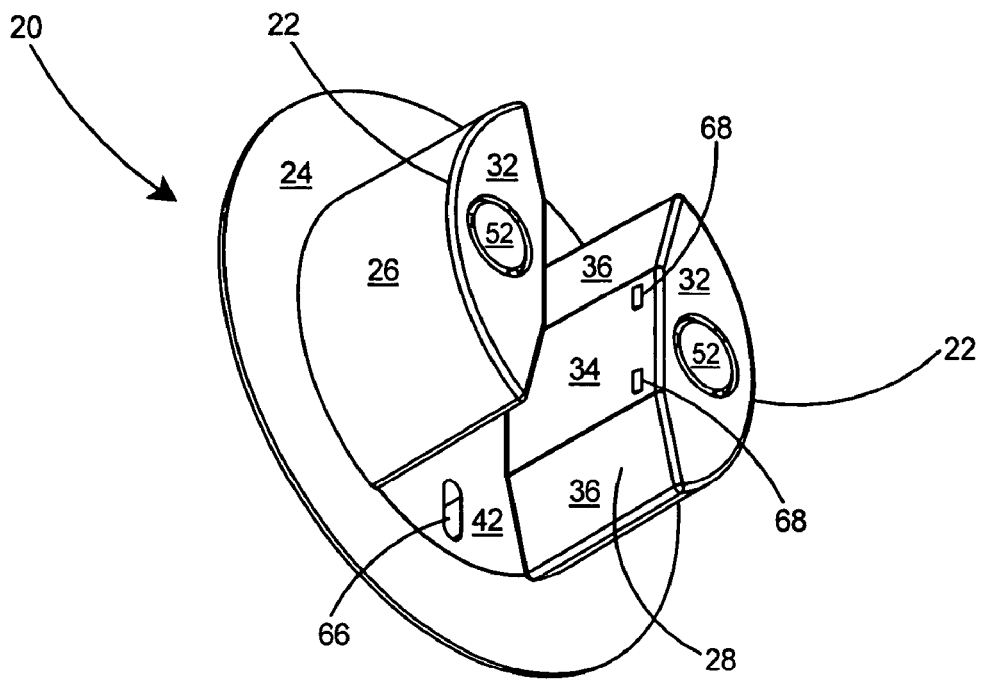
FIG. 2 is a top perspective view of the electrical fixture mounting assembly of FIG. 1.

With reference to the preferred embodiment in FIGS. 1 and 2, the present invention is an electrical fixture mounting assembly 20 for providing airtight mounting of an electrical fixture on a ceiling. The electrical fixture mounting assembly 20 includes two box members 22 connected by a transversely extending integral flange 24. The box members 22 each include an arcuate outer sidewall 26, an inner sidewall 28 separated by a central channel 30, and a top wall 32. The inner sidewalls 28 of each box member 22 include a planar center portion 34 and two planar outer portions 36. A peripheral wall 38 extends downward from the integral flange 24 and forms the boundary for a bottom opening 40. A bridge 42 extends between the inner sidewalls 28 of the box members 22 and across opposite sides of the peripheral wall 38. A lower cavity 44 is bound by the peripheral wall 38 and the bridge 42. Two upper cavities 46 are defined by the sidewalls 26 and 28 and top wall 32 of each box member 22. The lower cavity 44 of the electrical fixture mounting assembly 20 includes both a captive initial fastener 48 and captive mounting fasteners 50 that are accessible from the bottom opening 40. Removable wall portions 52 or knockouts are provided on the top walls 32 of each box member 22.

Figure 3:
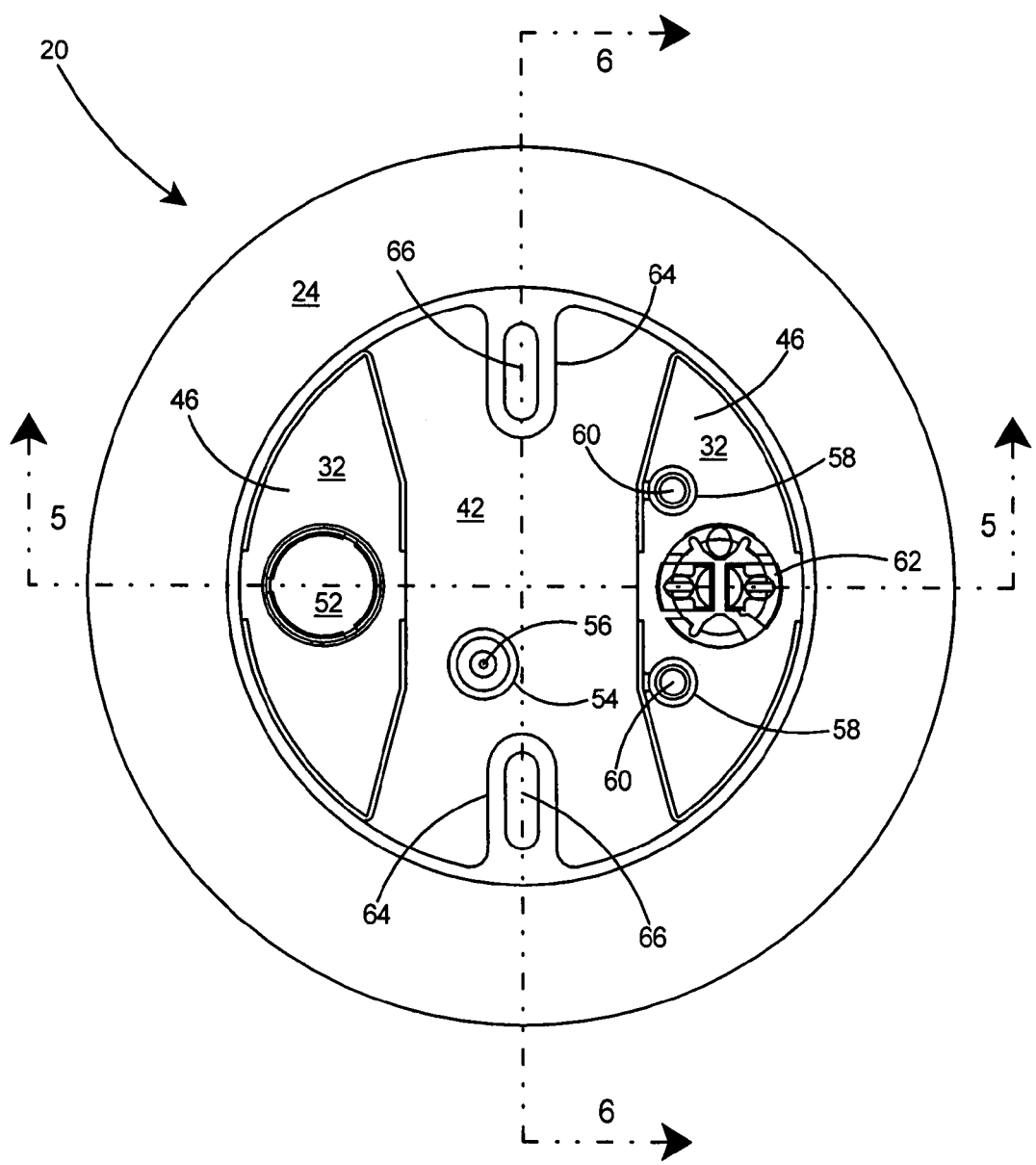
FIG. 3 is a bottom view of the mounting assembly of FIG. 1.

As shown in FIG. 3, the bridge 42 extends across the center of the bottom opening 40. A shallow boss 54 is provided integral with the bridge 42 and includes a bore 56. One of the upper cavities 46 includes two temporary storage receptacles or long bosses 58 having bores 60 therein. The long bosses 58 extend from and are integral with the top wall 32. The knockout in the upper cavity 46 on the right side of the figure has been removed and the resultant opening includes an electrical fitting 62 inserted therein. An electrical fitting 62 such as the Black Button™ fitting available from Arlington Industries, Scranton, Pa. can be inserted into the knockout to provide a fitting to grip an electrical cable (not shown) that is later inserted into the upper cavity 46. Two mounting bosses 64 with slots 66 therein are provided on opposite ends of the bridge 42.

Figure 4:
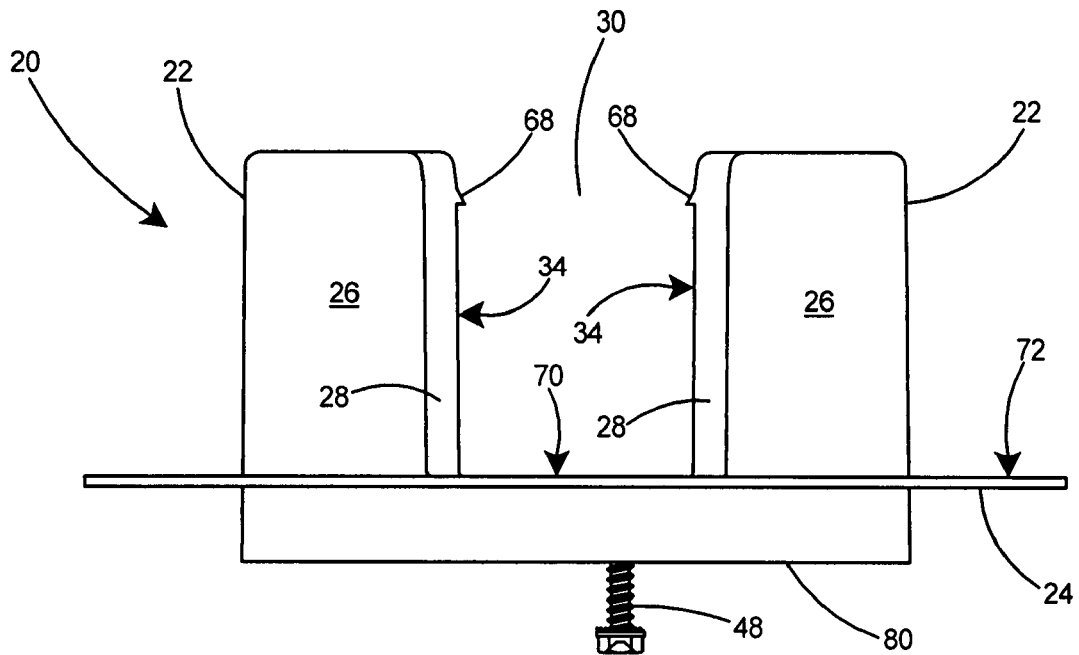
FIG. 4 is a side view of the mounting assembly of FIG. 1.
Figure 5:
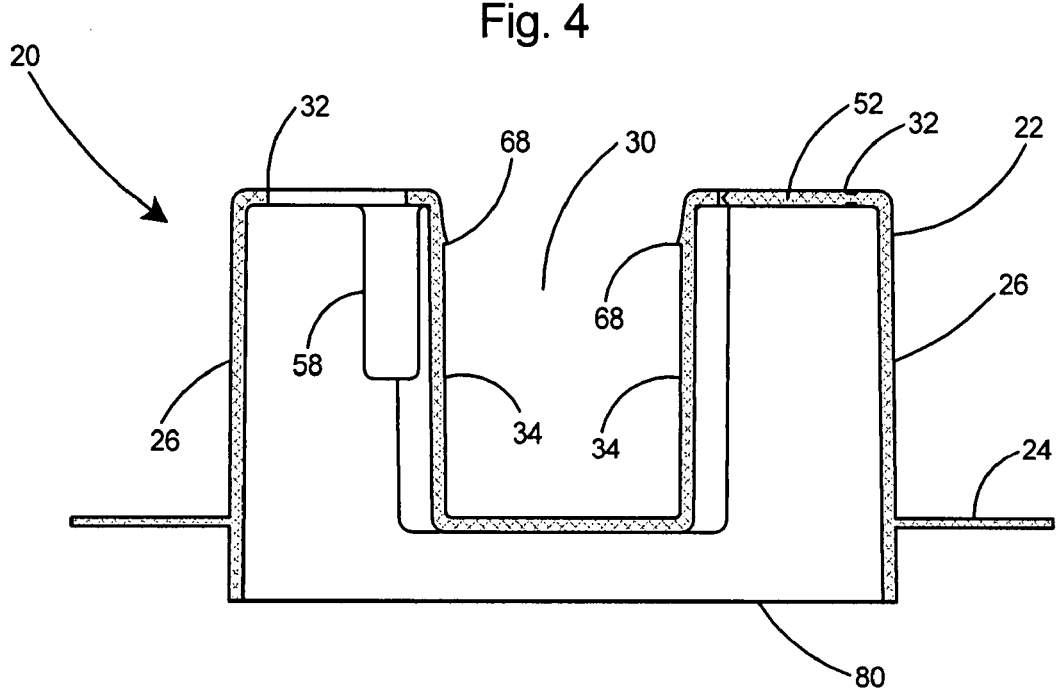
FIG. 5 is a sectional view of the mounting assembly taken along line 5-5 of FIG. 3.

With reference to FIGS. 4 and 5, the planar center portion 34 of the inner sidewalls 28 include teeth 68 extending inward into the central channel 30. As shown in FIG. 4, the top surface 70 of the bridge 42 and top surface 72 of the flange 24 are coplanar. As shown in FIG. 5, the long boss 58 is integral with and extends from the top wall 32.

Figure 6:
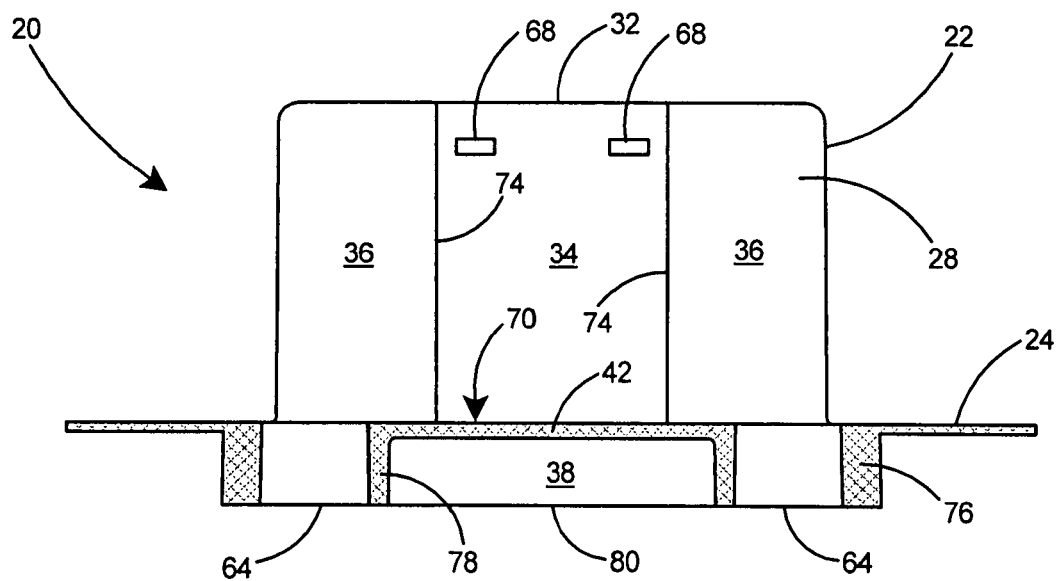
FIG. 6 is a sectional view of the mounting assembly taken along line 6-6 of FIG. 3.
Figure 7:
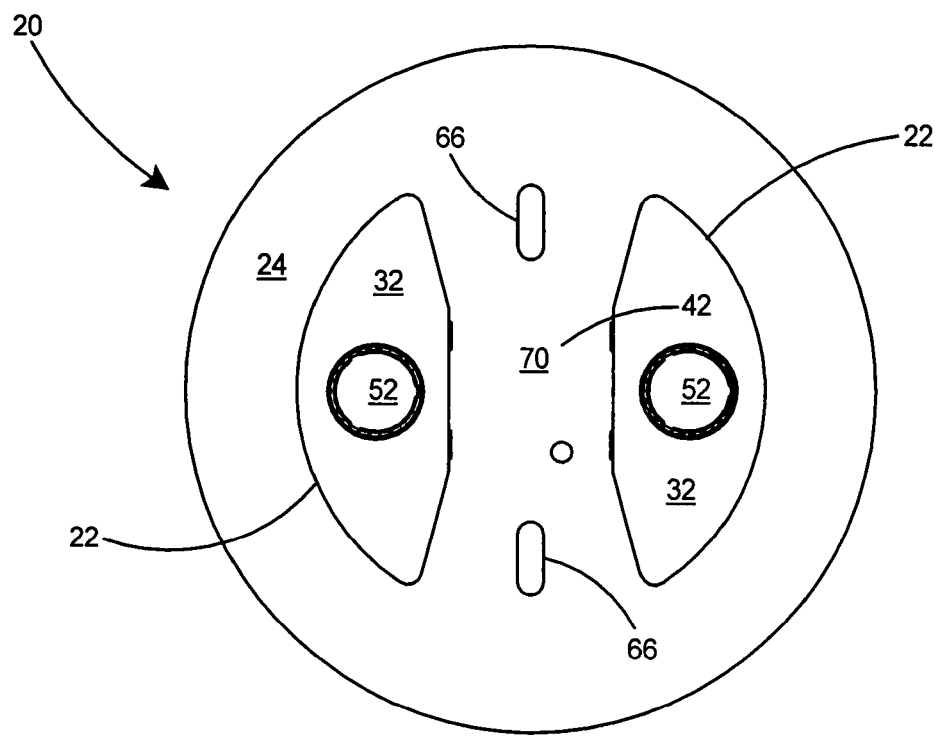
FIG. 7 is a top view of the mounting assembly of FIG. 1.

Referring to FIGS. 6 and 7, the planar center portion 34 of the inner sidewall 28 includes two teeth 68 that are positioned near the edges 74 of the center portion 34 and are equidistant from the top surface 70 of the bridge 42. The mounting bosses 64 include an outer wall portion 76 that is wider than the inner wall portion 78. The peripheral wall 38 includes a planar lower edge 80 that is parallel to the top walls 32 of the box members 22.

With reference to FIG. 8, a conceptual view of the electrical fixture mounting assembly 20 showing the location of the captive fasteners 48 and 50 within the assembly, the captive initial fastener 48 is frictionally held within the shallow boss 54 and the captive mounting fasteners 50, one of which is in view, are frictionally held within the long boss 58 that extends from the top wall 32 of the box member 22. As shown in FIG. 9 the long boss 58 includes thick wall portions 82 and a bore 60. The shallow boss 54, depicted in FIGS. 10 and 11, includes wall portions 84 that shield the head 85 of the captive initial fastener 48 when it is inserted fully within in the boss 54, thereby shielding the initial fastener 48 from contact with any electrical wiring that is later inserted within the lower cavity 44 of the mounting assembly 20 (see FIG. 8).

As shown in FIG. 8, the captive fasteners 48 and 50, including the initial fastener 48 and mounting fastener 50, are provided as an integral portion of the electrical fixture mounting assembly 20, with the fasteners captively held within their respective bosses 54 and 58. By providing the fasteners 48 and 50 with the mounting assembly 20, the fasteners are conveniently available to the installer at the time of installation and the installer is thereby freed of the task of finding and providing fasteners for the installation.

Figure 12:
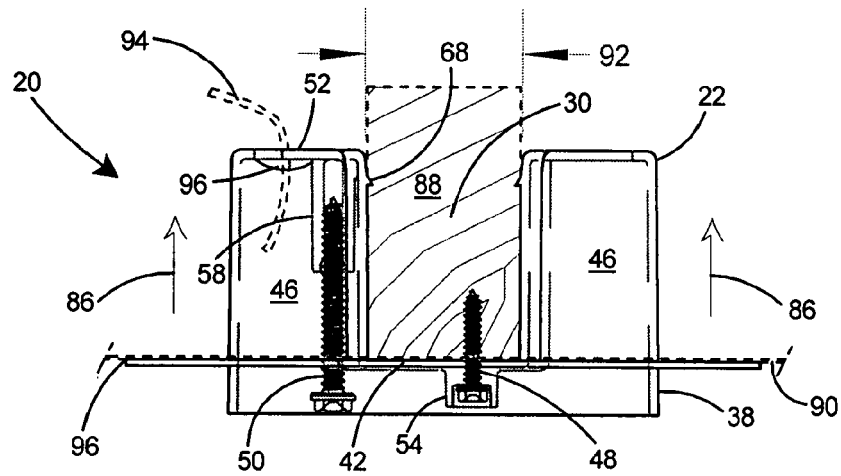
FIG. 12 is a conceptual view of the electrical box assembly mounted to a rafter with the view taken from the end of the rafter.
Figure 13:
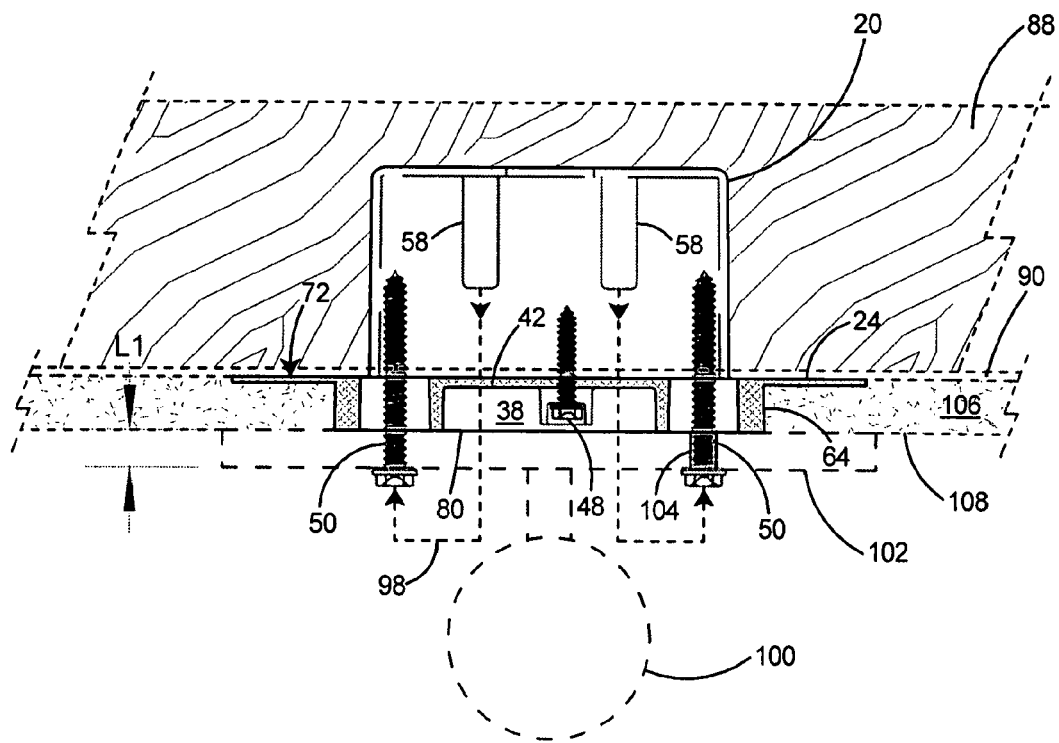
FIG. 13 is a conceptual view of the electrical box assembly mounted to a rafter, with the view taken from the side of the rafter.

Reference is made to FIGS. 12 and 13 for an understanding of the operation of the electrical fixture mounting assembly 20 of the present invention. For reducing air infiltration into the room, an overhead beam 88 typically includes a vapor barrier 90 secured to the underside of the beam 88. Duct Seal 96 is spread around the periphery of the top of the flange 24 of the mounting assembly 20. As shown in FIG. 12, the mounting assembly 20 is simply raised upwards, in the direction of arrow 86, with the central channel 30 in alignment with a rafter 88 or overhead beam until the top of the bridge 42 seats against the rafter 88 and the flange 24 seals against the vapor barrier 90. The duct seal 96 seals the flange 24 of the electrical fixture mounting assembly 20 against the vapor barrier 90. The span 92 of the channel 30 is sized to fit conventional sized rafters 88, such as 2×4 or 2×6 beams. As the mounting assembly 20 is pressed upwards onto the rafter 88, the teeth 68 bite into the sides of the rafter 88 and hold the mounting assembly 20 to the rafter 88. The captive initial fastener 48, which is held therein in shallow boss 54, is then tightened into the rafter 88 to hold the mounting assembly 20 to the rafter. With the mounting assembly 20 temporarily secured to the beam 88, the installer can then pull electrical cable or wiring 94 into the upper cavities 46 as needed to provide electrical supply to the mounting assembly 20. To seal against air infiltration at the entry point of the wiring 94, the installer can then press a sealing material such as duct seal 96 around the wiring 94 at its entry to the box member 22. Preferably, the duct seal 96 is provided with the electrical fixture mounting assembly 20. The duct seal 96, available in strips separated by a liner, is inserted into one of the upper cavities 46 and frictionally held therein until removed by the installer. Duct seal, available from Gardner Bender of Milwaukee, Wis., can be pressed around the periphery of the electrical wiring 94 and the knockout area 52 to seal the electrical box against air infiltration.

With reference to FIG. 13, when the mounting assembly 20 is raised against the rafter 88, the integral flange 24, having a flat top surface 72, seals against the vapor barrier 90 thereby preventing air infiltration around the periphery of the mounting assembly 20. After the mounting assembly 20 is secured temporarily to the beam 88 by the initial fastener 48, an electrical device such as light fixture 100 having a mounting ring 102 with apertures 104 therein, is aligned with the mounting assembly 20. The captive mounting fasteners 50 are then removed from their temporary storage receptacles 58 and moved along path 98 to the mounting bosses 64, which are aligned along the center of bridge 42, and fastened therein into the beam 88. The captive mounting fasteners 50 are load bearing fasteners of larger length and diameter than the initial fastener 48 and are capable of supporting the mounting assembly 20 and a heavy electrical device such as a fan. The mounting fasteners 50 hold the mounting assembly 20 and the electrical device 100 securely to the overhead beam 88. After the mounting assembly 20 is secured to the beam 88, sheetrock 106 is installed over the flange 24 and around the periphery of the mounting assembly 20. The length L1 of the peripheral wall 38 or distance of the lower edge 80 of the peripheral wall 38 from the flange 24 is approximately equal to the thickness of the sheetrock 106, thereby placing the lower edge 80 of the peripheral wall 38 approximately level with the surrounding ceiling 108.

The electrical fixture mounting assembly 20 may be constructed of metal or plastic. Most preferably, the box members 22 and flange 24 of the mounting assembly 20 are molded in one piece of a suitable plastic such as polycarbonate or polyvinylchloride. The captive initial fastener 48 is preferably a #10×1-inch long hexagon washer head sheet metal screw or equivalent. The captive mounting fasteners 50 are preferably a #12×2-inch long hexagon washer head sheet metal screw or equivalent. The electrical fixture mounting assembly 20 includes the one-piece box member 22 and flange 24 portion with the initial fastener 48 and mounting fasteners 50 frictionally held within their respective bosses 54 and 58 as shown in FIG. 8.

Having thus described the invention with reference to a preferred embodiment, it is to be understood that the invention is not so limited by the description herein but is defined as follows by the appended claims.

What is claimed is:

1. An electrical fixture mounting assembly comprising:
   a pair of box members including inner sidewalls;
   a bridge extending between said inner sidewalls of said box members, said bridge including a top surface;
   a channel defined by said top surface of said bridge and said pair of box members;
   temporary storage receptacles including mounting fasteners held in place therein;
   said temporary storage receptacles include a boss integral with and extending from one of said box members; and
   said boss including thick wall portions and a bore within said boss.

2. The electrical fixture mounting assembly of claim 1 including a flange coplanar with and extending transversely from said bridge, said flange extending outward of said box members.

3. The electrical fixture mounting assembly of claim 2 including a peripheral wall extending downward from said flange and defining a lower cavity therein.

4. The electrical fixture mounting assembly of claim 3 wherein
   said peripheral wall includes a planar lower edge; and
   said shallow boss extends no farther than said lower edge of said peripheral wall.

5. The electrical fixture mounting assembly of claim 4 wherein said mounting fasteners within said temporary storage receptacles extend no farther than said lower edge of said peripheral wall.

6. The electrical fixture mounting assembly of claim 2 wherein said box members, said bridge, and said flange are molded in one piece of plastic.

7. The electrical fixture mounting assembly of claim 1 including a captive initial fastener held in place therein.

8. The electrical fixture mounting assembly of claim 7 including
   a shallow boss extending downward from said bridge;
   a bore in said shallow boss; and
   an initial fastener held in place in said bore of said shallow boss.

9. The electrical fixture mounting assembly of claim 1 wherein each of said box members includes
   arcuate outer sidewalls; and
   a top wall.

10. The electrical fixture mounting assembly of claim 9 wherein said inner sidewalls, said arcuate outer sidewalls, and said top wall of each of said box members define an upper cavity therein.

11. The electrical fixture mounting assembly of claim 9 wherein said top wall of said box members include removable wall portions therein.

12. The electrical fixture mounting assembly of claim 1 wherein said inner sidewalls include
   a center portion; and
   two outer portions.

13. The electrical fixture mounting assembly of claim 12 wherein said center portion of said inner sidewalls includes one or more teeth projecting there from.

14. The electrical fixture mounting assembly of claim 1 wherein said bridge includes
   opposing ends; and
   a mounting boss at each of said opposing ends.

15. The electrical fixture mounting assembly of claim 14 wherein said mounting bosses include slots therein.

16. The electrical fixture mounting assembly of claim 15 wherein said mounting fasteners are moved from said temporary storage receptacles to said mounting bosses for securing said electrical fixture mounting assembly to an overhead beam.

17. The electrical fixture mounting assembly of claim 14 wherein said mounting bosses are centered on said bridge.

18. A method of attaching an electrical fixture of the type having a mounting ring with apertures therein to an overhead beam comprising:

providing an electrical fixture mounting assembly including a pair of box members including inner sidewalls and a top wall, an upper cavity within each of said box members, a bridge including a top surface, said bridge extending between said inner sidewalls of said box members, said bridge including opposing ends, a channel defined by said top surface of said bridge and said pair of box members, a flange coplanar with and extending transversely from said bridge, said flange extending outward of said box members, a shallow boss including an initial fastener held frictionally therein, a knockout in said top wall, temporary storage receptacles including mounting fasteners held frictionally therein, and mounting bosses including slots therein on said opposing ends of said bridge;

raising said electrical fixture mounting assembly onto the overhead beam such that said channel surrounds the beam and said bridge is flush against the beam;

temporarily securing said electrical fixture mounting assembly to the beam by driving said initial fastener into the beam;

removing said knockout from said top wall to form an opening therein;

installing electrical wiring through said opening into said upper cavity;

connecting the wiring to the electrical fixture;

aligning the apertures of the mounting ring of the electrical fixture with said slots in said mounting bosses;

removing said mounting fasteners from said temporary storage receptacles; and inserting said mounting fasteners through said slots in said mounting bosses and tightening said mounting fasteners to secure the electrical fixture to the beam.

* * * * *